United States Patent [19]

Robinson

[11] Patent Number: 4,562,430

[45] Date of Patent: Dec. 31, 1985

[54] POSITION DETECTION DEVICE FOR MAGNETIC BEARING

[75] Inventor: Alan A. Robinson, Wassenaar, Netherlands

[73] Assignee: Agence Spatiale Europeenne, Paris, France

[21] Appl. No.: 451,551

[22] Filed: Dec. 20, 1982

[30] Foreign Application Priority Data

Dec. 24, 1981 [FR] France .............................. 81 24241

[51] Int. Cl.$^4$ ............................................ G08C 19/10
[52] U.S. Cl. ................................. 340/870.37; 308/10; 324/61 R
[58] Field of Search ............ 74/471 XY, 74; 200/6 A; 340/365 C, 365 S, 365 R, 870.37, 709; 324/61 R; 329/204; 73/189; 308/10

[56] References Cited

U.S. PATENT DOCUMENTS

| | | | |
|---|---|---|---|
| 3,421,371 | 1/1969 | Williams, Jr. | 340/870.37 |
| 3,965,399 | 6/1976 | Walker, Jr. | 340/365 C |
| 3,992,674 | 11/1976 | Meyerhoff | 329/204 |
| 4,082,990 | 4/1978 | Stiles | 340/870.37 |
| 4,238,781 | 12/1980 | Vercelloth | 340/870.37 |
| 4,246,452 | 1/1981 | Chandler | 340/365 C |
| 4,285,553 | 8/1981 | Robinson | 308/10 |
| 4,305,007 | 12/1981 | Hughes | 340/365 C |
| 4,320,392 | 3/1982 | Giovinazzo | 200/6 A |
| 4,364,047 | 12/1982 | Archer | 200/6 A |

OTHER PUBLICATIONS

Millman and Halkias, *Integrated Electronics: Analog and Digital Circuits and Systems*, McGraw-Hill, 1972, pp. 501-503, 539-540.

Primary Examiner—John W. Caldwell, Sr.
Assistant Examiner—Michael F. Heim
Attorney, Agent, or Firm—Kramer and Brufsky

[57] ABSTRACT

A device comprising a capacitive transducer comprised of a fixed member comprising first and second axially separated equal diameter metallic electrode rings and a movable member comprised of a thin walled metallic cylinder separated from the fixed member by an annular gap such that said movable member capacitively couples said first and second rings of the fixed member. The first ring of the fixed member is comprised of a continuous metallic ring glued onto an insulating supporting means, and the second ring is comprised of four thin metal foil electrodes separated by four equi-width narrow gaps spaced at angular intervals of 90° and glued onto an insulating supporting means. The first electrode ring of the fixed member is electrically connected to an alternating current power source and each pair of diametrically opposed electrodes of the second ring of the fixed member are electrically connected to a position control loop circuit.

6 Claims, 4 Drawing Figures

POSITION DETECTION DEVICE FOR MAGNETIC BEARING

BACKGROUND OF THE INVENTION

The present invention relates to an improved detection device for use in a magnetic bearing of the radially active/ axially passive type for detecting both radial and tilting displacements of the rotor member of the bearing in relation to the stator member thereof.

A magnetic bearing apparatus which this invention is concerned with comprises stator and rotor members coaxially disposed one around the other without mechanical contact therebetween. The stator or the rotor member bears a permanent magnet, the magnetic flux of which ensures the axial alignment of the rotor member relative to the stator member. The latter member also bears electric coils positioned such that two of these coils are centered on each axis in the common plane of the stator and rotor members. These coils generate in the annular radial gap between the stator and the rotor members, magnetic fields serving, in a manner known per se to control the radial position of the rotor member relative to the stator member along the two orthogonal axes in their common plane. For that purpose, the pair of coils controlling the radial position along a same axis are usually connected in series or in parallel in an electronic control circuit. When the rotor member is radially displaced along e.g. the X-axis relative to its centered position with respect to the stator member, the position deviation signal is electronically processed such that an electric current flows through the two coils controlling the X-axis in one sense or the opposite depending on the polarity of the position deviation signal. The resulting magnetic fields then are such that the magnetic flux of the permanent magnet is increased in the wider gap and is decreased in the smaller gap. As a consequence, the rotor member is attracted more strongly towards the stator member where the gap is wider, thereby restoring the rotor member to its centered position.

A magnetic suspension apparatus of this type necessarily comprises a detection device for detecting the radial position of the rotor member in relation to the stator member and for generating the electric position deviation signals to be used to correct the position of the rotor member.

The known position detection devices are devices of comparatively small dimensions relative to the dimensions of the rotor member used in the magnetic bearings considered for space applications. Generally, use is made of position detection devices of the electro-optic type as described for instance in the U.S. Pat. Nos. 4,000,929 and 4,043,614. However these prior art detection devices used for this purpose generally suffer from one or more of the following important limitations.

Most of the detection devices employ position sensitive elements which have relatively small physical dimensions in relation to the size of the rotor member. This causes these devices to exhibit a relatively high level of noise due to the rotor surface irregularities and the rotor shape error. This noise is particularly troublesome when differentiating networks are used in the magnetic bearing suspension control electronics.

In general, the prior art position detection devices are designed so as to be insensitive to all but radial displacements of the rotor member. When these devices are incorporated in magnetic bearings this usually means that they provide very little useful signals for controlling the tilting motions and, therefore, they do not make good sensors for use in systems for actively damping such tilting motions.

Most of the prior art position detection devices have relatively complex electronic circuits associated therewith. This is especially true for alternating current devices where phase sensitive demodulation circuits are normally employed. This complexity has a negative influence on the reliability of the suspension bearing and the ease with which it can be brought to an operational state.

The above limitations are overcome with the radial position detection device according to the invention.

SUMMARY OF THE INVENTION

The object of this invention is a radial position detection device comprising a capacitive transducer which consists of a fixed member comprising first and second axially separated equal-diameter metallic electrode rings and a movable member comprised of a thin walled metallic cylinder separated from the fixed member by an annular gap such that said movable member capacitively couples said first and second rings of the fixed member. The first ring of the fixed member is comprised of a continuous metallic ring glued onto an insulating supporting means, and the second ring is comprised of four thin metal foil electrodes separated by four equi-width narrow gaps spaced at angular intervals of 90° and glued onto an insulating supporting means. The first electrode ring of the fixed member is electrically connected to an alternating current power source and each pair of diametrically opposed electrodes of the second ring of the fixed member are electrically connected to a position control loop circuit.

In a particular embodiment, the axial height of the movable member is smaller than that of the fixed member, with the movable member being positioned relative to the fixed member such that an upper portion of the upper ring electrodes of said fixed member projects from the upper extremity of the movable member.

Advantageously, the transducer is attached to the magnetic suspension bearing with an electrostatic screen disposed between the fixed member of the transducer and the electromagnetic coils borne by the stator member of the bearing.

Preferably, the transducer is positioned on the bearing in such a way that the horizontal plane containing the center of mass of the suspended member is offset in relation to the median horizontal plane of the annular gap of the bearing in a direction opposite to that in which the upper electrodes of the fixed member of the transducer project from the upper extremity of the movable member.

DESCRIPTION OF EXEMPLARY EMBODIMENTS OF THE INVENTION.

Figure 1:
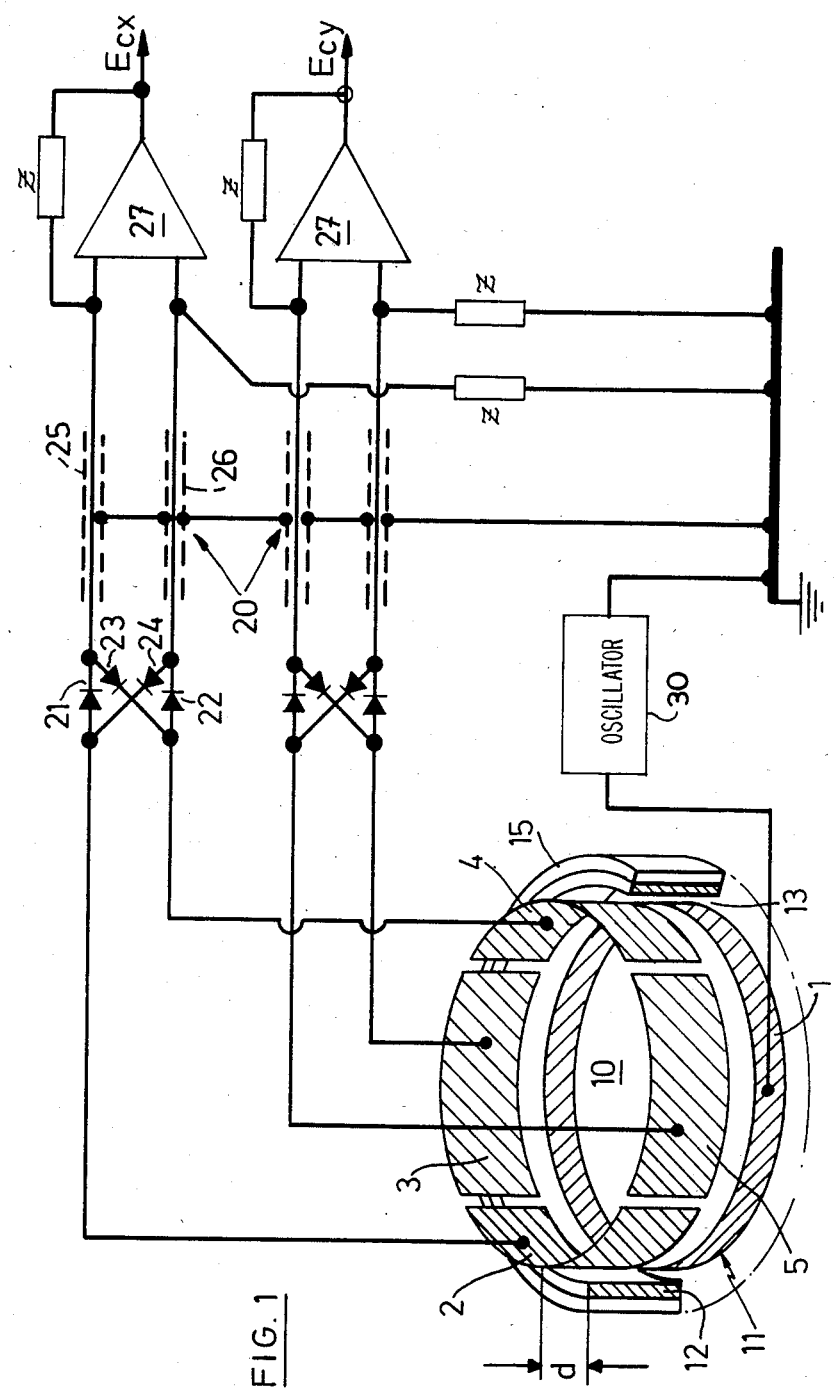
FIG.1 depicts the position detection device according to the invention.

Referring to FIG. 1 the detection device comprises a transducer 10 of novel design, two identical electronic circuits 20 and an oscillator 30. The transducer 10 comprises a fixed member 11 and a movable member 12 disposed in an approximately coaxial fashion so that the movable member 12 surrounds the fixed member 11 with a small annular gap 13 therebetween. The fixed member 11 consists of five thin metallic foil electrodes 1,2,3,4,5 glued onto an insulating supporting means 14 (shown in FIG. 2) in such a way as to form two axially separated equal diameter rings. The lower ring 1 is continuous and the upper ring is comprised of four foil electrodes 2,3,4,5 separated by four equi-width narrow gaps spaced at angular intervals of 90°. The movable member 12 consists of a thin walled metallic cylinder glued onto an insulating supporting means 15. The upper extremities of the fixed and movable parts do not, in general, lie in the same plane but are displaced axially by a certain distance d, with a portion of the height of the electrodes 2-5 projecting from the upper extremity of the movable member 12.

The lower ring 1 is connected to an electronic oscillator 30 arranged to produce a continuous square wave voltage at a high frequency, e.g. a voltage of several volts peak to peak at a frequency of several hundred kilohertz. The diametrically opposed electrodes 2,4 and 3,5 are connected to the input terminals of two identical electronic demodulation circuits consisting of a network of four diodes 21-24 situated in close proximity to the electrodes 2-5. The purpose of these circuits is to produce a reliable and stable control signal which is proportional to the radial displacement of the movable member 12 in relation to the fixed member 11. The output terminals of each demodulation circuit are connected through screened cables 25 and 26 to the input terminals of an operational amplifier 27 which forms with the demodulator circuit an electronic conversion circuit 20 used to convert the transducer output signal into a DC analog signal Ec for serving as a control signal for energizing a control circuitry in a manner known per se.

The operation of the position detection device is described with reference to FIG. 2 which represents the circuitry associated to the X-axis. Operation in the Y-axis is identical. The reference numerals A and B denote the widths 13 at both extremities of the transducer 10 on the X-axis.

Figure 2:
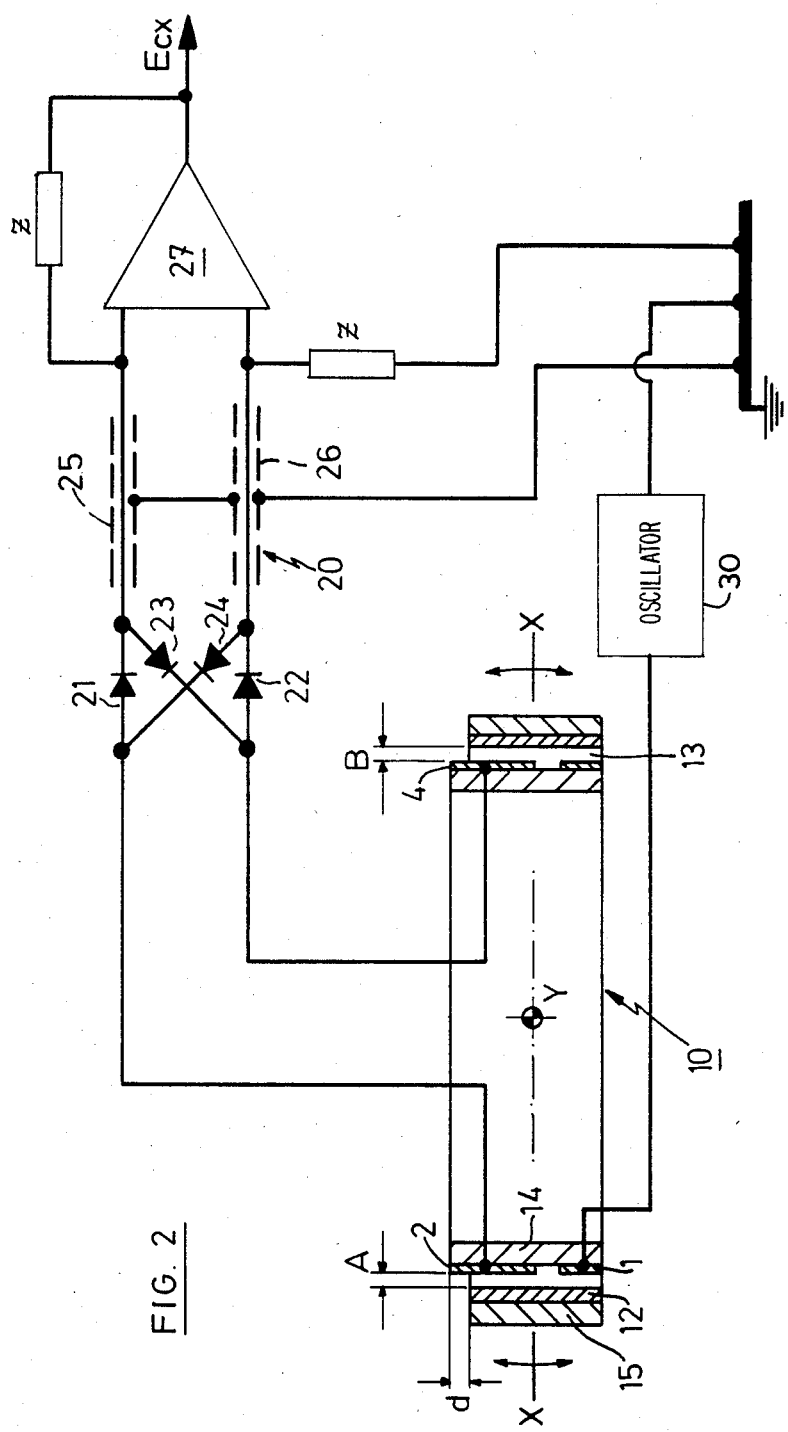
FIG.2 is an axial sectional view of the transducer part of the device of FIG. 1, together with the electronic conversion circuitry in accordance with an aspect of this invention for the control of a position control loop circuit associated with one control axis.

With reference to FIG. 2, if the movable member of the transducer 10 is displaced radially so that gap A is smaller than gap B, then the capacitive coupling between electrode 2 and the movable ring 12 is greater than that between electrode 4 and the ring 12. This means that for positive transitions and subsequent half waves of the excitation signal, the capacitance of the screened cable 25 will be more positively charged through diode 21 than will the capacitance of the screened cable 26 through diode 22. Also, for negative transitions and subsequent half waves of the excitation signal, the capacitance of screened cable 26 will be more negatively charged through diode 24 than will the capacitance of screened cable 25 through diode 23. Therefore, the output voltage of the operational amplifier 27 will take on a negative value.

By a similar reasoning it can be shown that if the movable member 12 of the transducer 10 is displaced radially so that gap B is smaller than gap A, then the output voltage of the operational amplifier 27 will take on a positive value.

It is important to note that the absolute amplitudes of the high frequency voltages which appear on the electrodes are always considerably greater than the forward voltage drops associated with the diodes, even when there is no radial displacement of the movable member. There is, therefore, no loss of sensitivity at small displacements due to diode voltage drops. Also, in order to ensure a linear output voltage vs. displacement relationship over the full displacement range, the nominal radial gap between the fixed and movable members of the transducer should be chosen such that the difference in the amplitudes of the high frequency voltages appearing on the electrodes controlling the same axis (2,3 and 4,5) is always less than the forward voltage drop of the two diodes in series, even when the movable member is maximally displaced.

If the movable member 12 of the transducer is tilted in a clockwise direction about a transverse axis in its midplane, e.g. the X-axis of FIG. 2, then gap A becomes smaller than gap B and a negative output voltage is produced by the operational amplifier 27 in a similar manner to that described hereinbefore for a pure radial displacement. Conversely, if the movable member 12 is tilted in an anticlockwise direction, gap B becomes smaller than gap A and a positive voltage is produced by the operational amplifier 27. Now in magnetic bearings and especially in annular magnetic bearings, geometrical constraints generally dictate that the transducer is implemented with a relatively large diameter-to-axial height ratio. This means that the gaps A and B will undergo only slight changes in their radial widths as the movable member is tilted, with the result that the tilt sensitivity exhibited through the mode of working just described is then generally insufficient. The tilt sensitivity is enhanced by the fact that the movable member 12 is made axially shorter than the electrode assembly of the fixed member 11 by an amount d (typically between 0 and 0.33 of the axial height of the electrodes). Tilt displacements of the movable member now result in a considerable differential change in movable ring/electrode overlap at diametrically opposed electrodes and hence a substantial increase in tilt gain is obtained.

The invention also provides particular features to be implemented for mounting the position detection device described in the foregong with a view to enhance the suspension stability and the tilt sensitivity. These particular features are: (a) provision of an electrostatic and electromagnetic screen between the transducer of the detection device and the source of suspension magnetic field, and (b) provision of an offset between the center of mass of the suspended member and the radial line of action of the bearing as explained hereinafter with reference to FIGS. 3 and 4 which show two different ways in which the position detection device of the invention might be realized and built into magnetic bearing momentum wheels as used for spacecraft attitude control.

Figure 3:
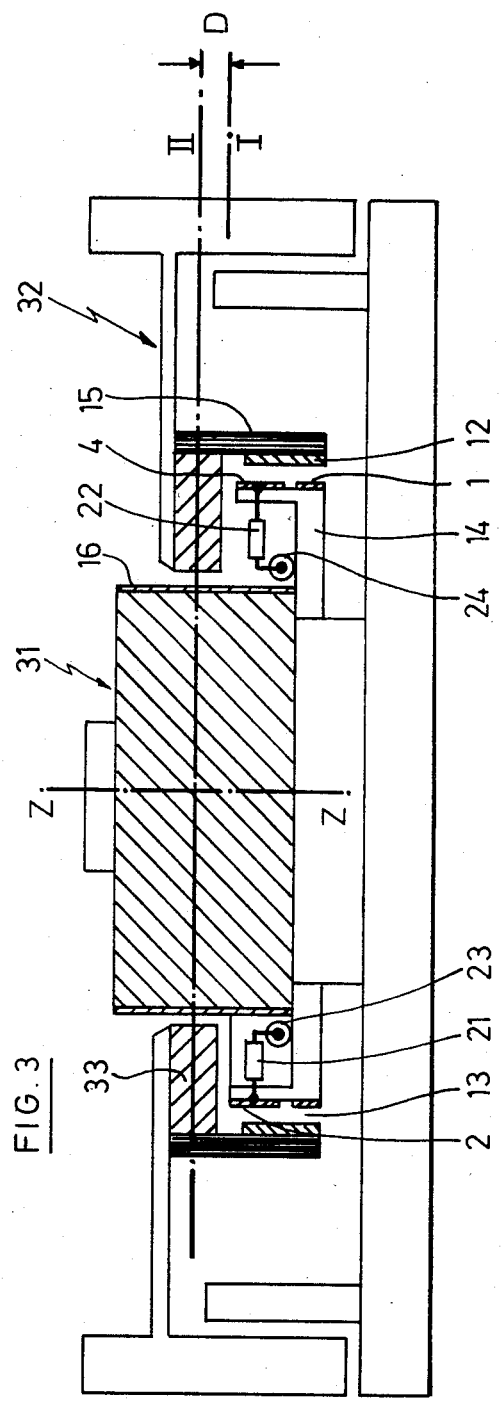
FIGS. 3 and 4 show two ways in which the position detection device of this invention can be implemented into two exemplary magnetic bearing embodiments.

FIG. 3 is an axial sectional view of a typical embodiment as applied in a reaction wheel with compact centrally located magnetic bearing. This bearing comprises a stator member 31 and a rotor member 32 coaxially disposed about the common axis Z. The stator member 31 bears four electromagnetic coils (not shown) located in a diametrically opposite fashion on two orthogonal axes X and Y in a same horizontal plane. The rotor member 32 bears an annular permanent magnet 33. The drawing clearly depicts the way of mounting the transducer 10 according to this invention for the purpose of detecting the radial and tilt displacement of the rotor member 32 in relation to the stator member 31.

The fixed member of said transducer, the electrodes 1,2 and 4 of which are labeled in FIG. 3, is mounted on an insulating supporting means 14 secured underneath the stator member and the movable member 12 of said transducer is mounted on an insulating supporting means 15 fixed underneath the rotor member 32. The electrostatic screen consists of a thin non-magnetic metallic sheath 16 enclosing the stator member 31 and passing through the gap between the rotor and stator members. The sheath serves not only as a screen between the transducer 10 and the electromagnetic coils beared by the stator member 31, but also as a guard against the ingression of magnetic particles into the stator, as a mechanical protection for the coils, and as a means whereby axial removal and replacement of the rotor member of the wheel is greatly simplified.

On FIG. 3 one can notice an axial offset D between the horizontal plane I containing the center of mass of the suspended assembly and the median radial horizontal plane II containing the radial line of action of the magnetic bearing. Said offset D permits the tilting motions of the rotor member to be both observed and controlled by the active suspension loops (i.e., position detection and suspension control system). This implementation provides a simple but effective means whereby the tilt sensitivity of the position detection device can be employed to good effect for tilt motion damping purposes. In physical terms, the tilt damping action may be understood as due to dynamic radial forces produced by the bearing in response to tilt displacement signals from the position detection device, acting through the lever arm formed by said offset D so as to produce torques on the suspended unit opposing the original tilt displacement that caused them.

A necessary condition for positive damping of the tilting motion is that the plane I containing the center of mass of the suspended unit is offset from the plane II of radial line of action of the magnetic bearing in a direction opposite to that in which the upper electrodes 2-5 of the fixed member 11 of the transducer 10 project from the upper extremity of the movable member 12 of the transducer.

Figure 4:
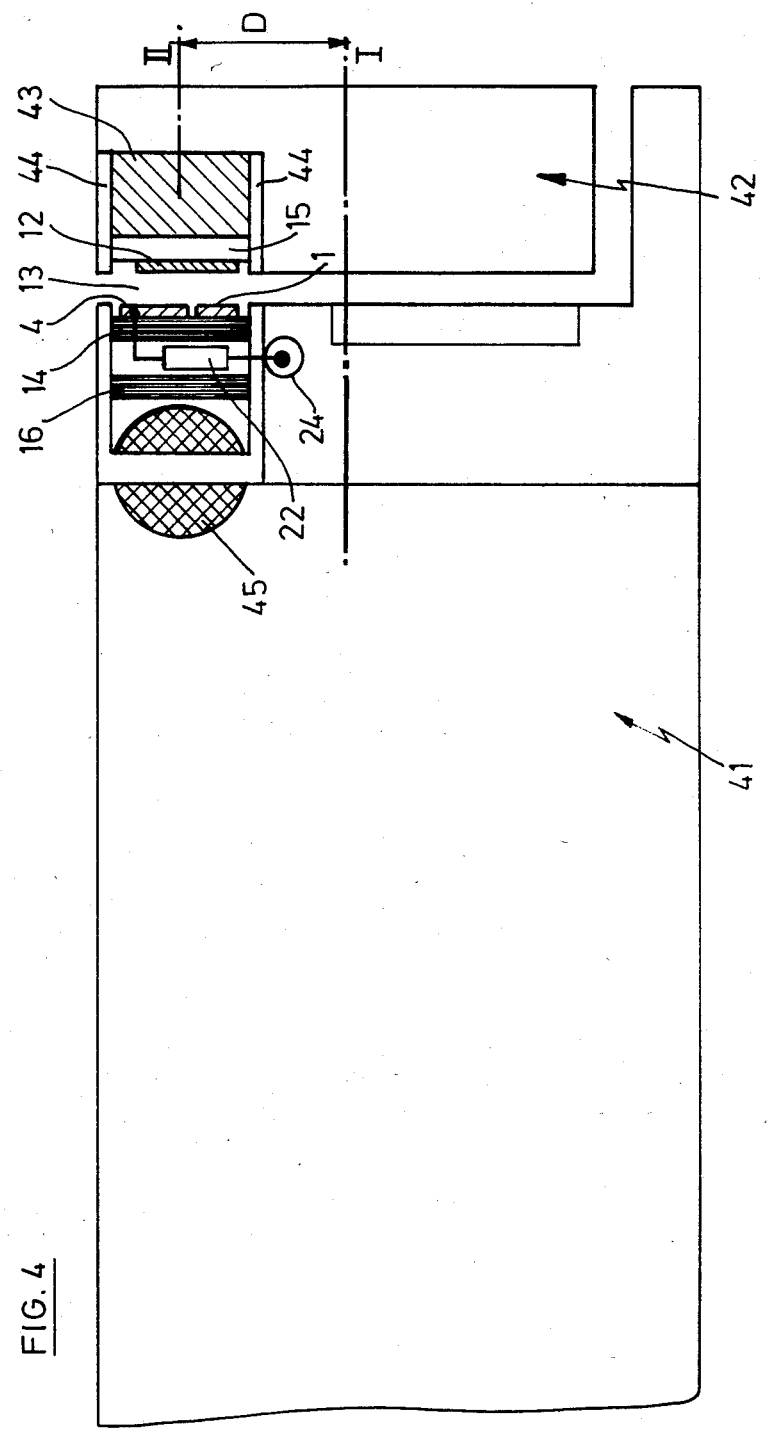

FIG. 4 shows, at a larger scale, an alternative embodiment as used in a different type of reaction wheel having an annular peripherally located magnetic bearing. In this example the stator member 41 is a ring having a U-shaped cross-section and it is coaxially surrounded by a peripheral rotor member 42 consisting of an annular permanent magnet 43 sandwiched between two planar annular pole pieces 44 extending in the planes containing the pole flanges of the stator member 41. The axial ring web portion of the stator member bears the electromagnetic coils, such as coil 45, which extend each over a segment of the ring web. In this embodiment the fixed member of the transducer 10 is mounted on a cylindrical insulating support means 14 extending between the flanges of the stator member and the cylindrical electrostatic screen 16 also extends between the stator flanges such as to separate the coils 45 from the transducer electrodes. Noticeable is the axial offset D between the horizontal plane I containing the center of mass of the suspended unit and the horizontal plane I of the radial line of action of the magnetic bearing as well as the sense of said offset relative to the sense of the projection of the upper electrodes of the fixed member of the transducer from the upper extremity of the movable member.

What is claimed is:

1. A position detection device for detecting the position of a movable member in relation to a fixed member along two axes, said position detection device comprising:
   a capacitive transducer including a fixed member and a movable member separted from each other by an annular gap;
   said fixed member comprising first and second axially separated equal-diameter metallic electrode rings, the first of said rings being a continuous metallic electrode mounted onto an insulating support and the second of said rings comprising four thin metal foil electrodes separated by four equal-width narrow gaps spaced at angular intervals of 90° mounted onto an insulating support;
   said movable member comprising a thin walled metallic cylinder concentrically surrounding the fixed member such that said movable member capacitively coupled the first and second electrode rings of said fixed member;
   means for connecting each pair of diametrically opposed electrodes of said second ring of the fixed member to an electronic position control circuit; and
   means for connecting the first ring of the fixed member to a voltage source.

2. A position detection device as claimed in claim 1 wherein the movable member has an axial height smaller than that of the fixed member, with the movable member being positioned relative to the fixed member such that a portion of the electrodes of said second ring of the fixed member projects from the upper extremity of the movable member.

3. A position detection device as claimed in claim 1, wherein each pair of diametrically opposed electrodes of said second ring of the transducer means is electrically connected to a demodulation circuit means comprised of diode bridge means located in the vicinity of said electrodes, the output terminals of said demodulation circuit being connected through screened cables to circuitry means for producing a signal representative of the radial displacement of the movable member of the transducer relative to the fixed member thereof.

4. A position detection device as claimed in claim 1, wherein the voltage source is a continuous square wave voltage source.

5. In a magnetic suspension apparatus comprising a stator member, a rotor member coaxial with the stator member, the rotor member surrounding the stator member with a radial annular gap therebetween, and further comprising permanent magnet means on the stator or rotor member, said stator member including electromagnetic coils for generating, when traversed by an electric current, magnetic fluxes across said radial annular gap for the control of the radial position of the rotor member relative to the stator member, the improvement comprising:
   a position detection device for detecting the radial position of the rotor member in relation to the stator member, said position detection device comprising a capacitive transducer including a fixed member and a movable member separated from each other by a radial annular gap, the fixed member being attached to said stator member and the movable member being attached to said rotor member, and an electrostatic screen made of a nonmagnetic electro-conductive material, said electrostatic screen being attached to the stator member so as to be positioned between the fixed member of the transducer and said electromagnetic coils.

6. A magnetic suspension apparatus as claimed in claim 5, wherein the movable member of the transducer means has an axial height smaller than that of the fixed member and is positioned relative to the fixed member such that a portion of said fixed member projects from the extremity of the movable member, and wherein the horizontal plane containing the center of mass of the suspended assembly is offset in relation to the median horizontal plane of the radial annular gap of the magnetic suspension apparatus in a direction opposite to that in which the fixed member of the transducer means projects from the extremity of the movable member of said transducer means.

* * * * *

UNITED STATES PATENT AND TRADEMARK OFFICE
CERTIFICATE OF CORRECTION

PATENT NO. : 4,562,430

DATED : December 31, 1985

INVENTOR(S) : Alan A. Robinson

It is certified that error appears in the above-identified patent and that said Letters Patent is hereby corrected as shown below:

Claim 1, line 14, change "separted" to -- separated -- .

Claim 1, line 24, change "coupled" to -- couples -- .

Signed and Sealed this

Fourth Day of March 1986

[SEAL]

Attest:

DONALD J. QUIGG

Attesting Officer

Commissioner of Patents and Trademarks